US011950709B2

(12) United States Patent
Bock et al.

(10) Patent No.: US 11,950,709 B2
(45) Date of Patent: Apr. 9, 2024

(54) BACKREST SUPPORT FOR A SEATING FURNITURE

(71) Applicant: BOCK 1 GmbH & Co. KG, Postbauer-Heng (DE)

(72) Inventors: Hermann Bock, Pyrbaum (DE); Stefan Ploetz, Neumarkt (DE)

(73) Assignee: Bock 1 GmbH & CO. KG, Postbauer-Heng (DE)

( * ) Notice: Subject to any disclaimer, the term of this patent is extended or adjusted under 35 U.S.C. 154(b) by 0 days.

(21) Appl. No.: 17/663,842

(22) Filed: May 18, 2022

(65) Prior Publication Data

US 2022/0369815 A1 Nov. 24, 2022

(30) Foreign Application Priority Data

May 21, 2021 (DE) ...................... 10 2021 113 337.8

(51) Int. Cl.
*A47C 7/42* (2006.01)
*F16B 2/14* (2006.01)
*F16B 2/18* (2006.01)

(52) U.S. Cl.
CPC .................. *A47C 7/42* (2013.01); *F16B 2/14* (2013.01); *F16B 2/185* (2013.01)

(58) Field of Classification Search
CPC ....................................................... A47C 7/42
See application file for complete search history.

(56) References Cited

U.S. PATENT DOCUMENTS

| | | | | |
|---|---|---|---|---|
| 5,839,784 A | * | 11/1998 | Breen .................. | A47C 1/0307 297/301.7 |
| 5,944,387 A | * | 8/1999 | Stumpf .................... | A47C 1/03 297/411.37 |
| 6,409,266 B1 | * | 6/2002 | Chen ........................ | A47C 1/03 297/383 |
| 11,213,132 B1 | * | 1/2022 | Wu .......................... | A47C 7/42 |

(Continued)

FOREIGN PATENT DOCUMENTS

CN 112369854 A 2/2021
EP 2792276 A1 10/2014

(Continued)

OTHER PUBLICATIONS

German Patent and Trademark Office, Search Report in Application No. DE10 2021 113 337.8, dated Feb. 1, 2022, 5 pages, Munchen Germany.

(Continued)

*Primary Examiner* — Timothy J Brindley
(74) *Attorney, Agent, or Firm* — Marshall & Melhorn, LLC

(57) ABSTRACT

The invention relates to a backrest support for a seating furniture, in particular for an office chair.
In order to provide a piece of seating furniture having a backrest, in the case of which particularly simple and safe installation and removal of the backrest is possible, it is proposed to design the backrest support (2) in two parts, having a first support part (4), which is connectable to a second support part (5) without a tool, with a releasable connection being formed, wherein, in the assembled state, the position of the two support parts (4, 5) with respect to each other can be secured without a tool by means of a lock (6).

10 Claims, 8 Drawing Sheets

(56) References Cited

U.S. PATENT DOCUMENTS

| | | | | |
|---|---|---|---|---|
| 11,622,631 B1* | 4/2023 | Berkowitz | ............. | A47C 7/546 |
| | | | | 297/452.41 |
| 2011/0068613 A1* | 3/2011 | Breitkreuz | ............... | A47C 7/42 |
| | | | | 297/440.15 |
| 2011/0140498 A1* | 6/2011 | Tsai | ..................... | A47C 1/0307 |
| | | | | 297/411.38 |
| 2017/0027329 A1* | 2/2017 | Su | ........................ | A47C 1/0307 |
| 2021/0246925 A1 | 8/2021 | Slach et al. | | |

FOREIGN PATENT DOCUMENTS

| | | | | | |
|---|---|---|---|---|---|
| EP | 2896326 | A1 | | 7/2015 | |
| KR | 20110031120 | A | * | 3/2011 | |
| KR | 20110061818 | A | * | 6/2011 | |
| KR | 20120116141 | A | * | 10/2012 | |
| TW | 703946 | B | | 9/2020 | |
| WO | WO-2004082435 | A1 | * | 9/2004 | ............... A47C 7/42 |
| WO | 2015000904 | A1 | | 1/2015 | |
| WO | WO-2015135632 | A1 | * | 9/2015 | ............. A47C 1/032 |

OTHER PUBLICATIONS

European Patent Office, Search Report in Appliction No. EP 22020228. 7, dated Sep. 29, 2022, 6 pages.

\* cited by examiner

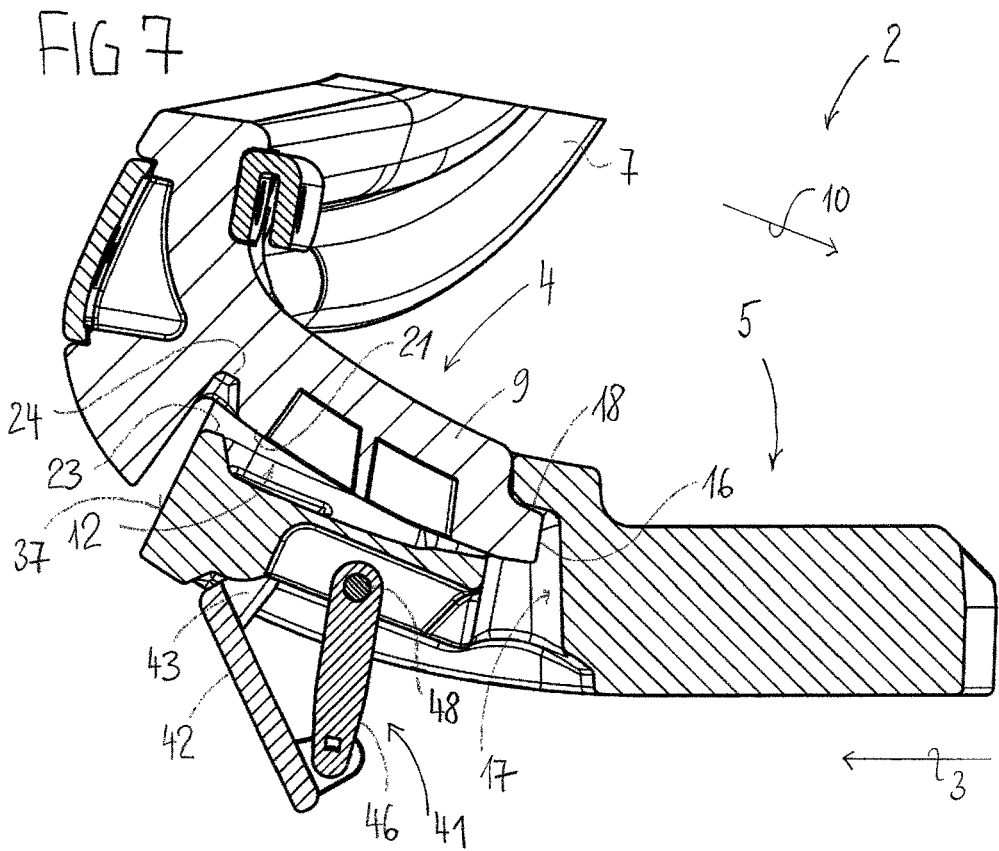
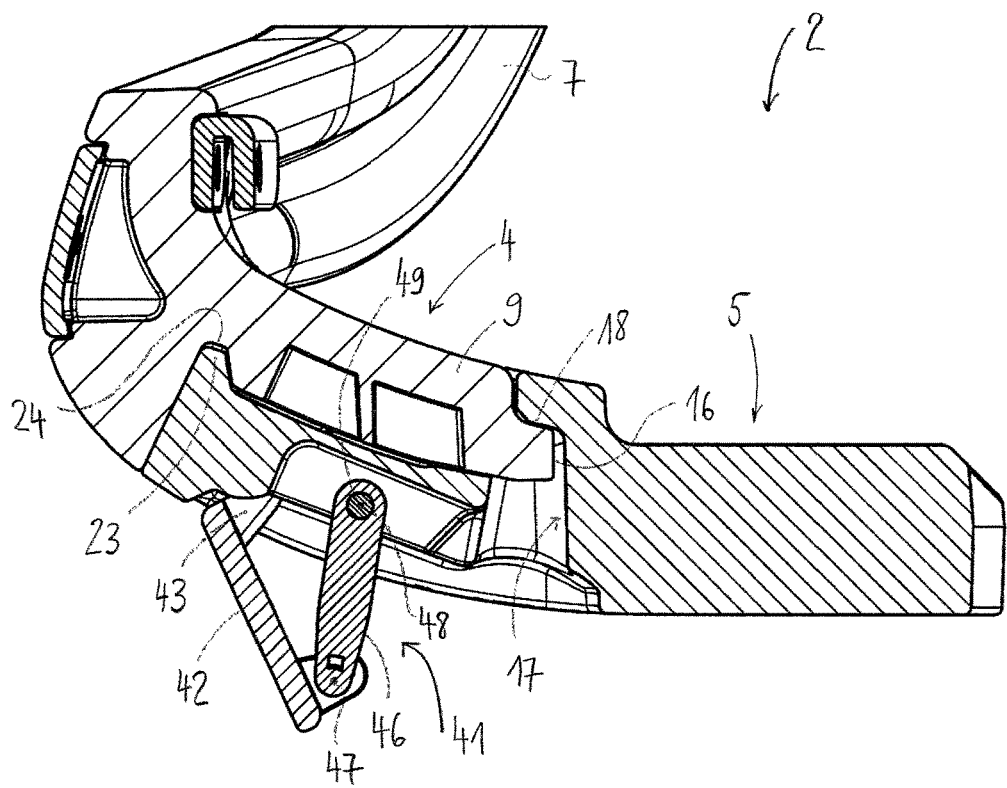

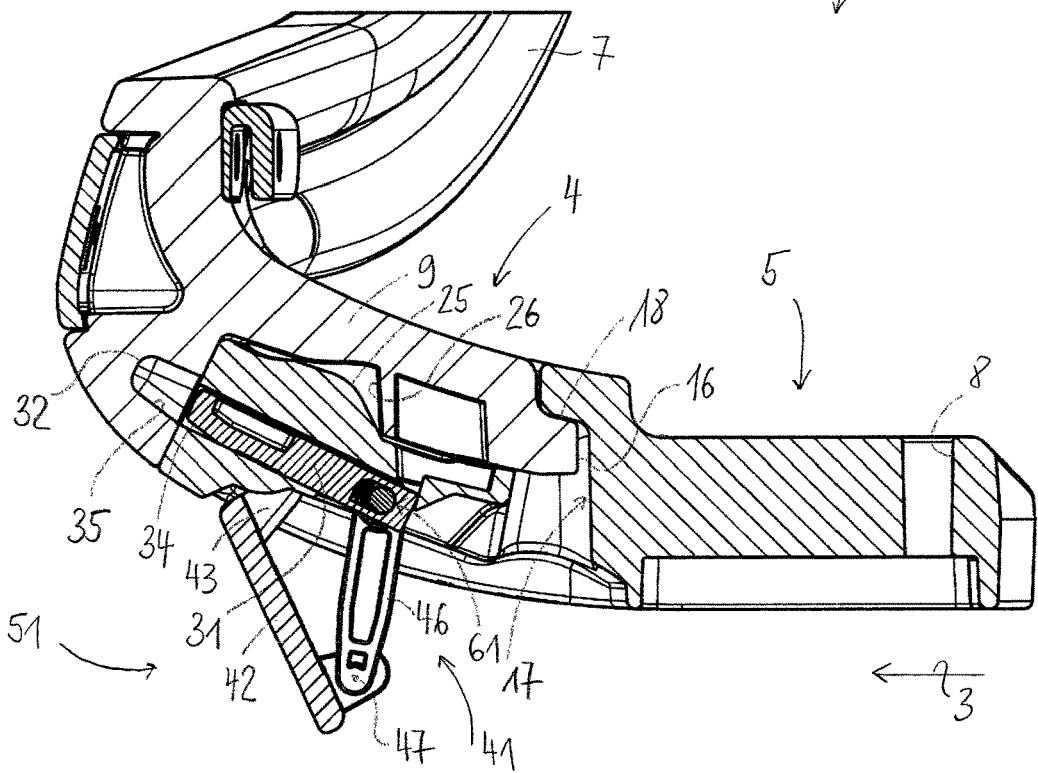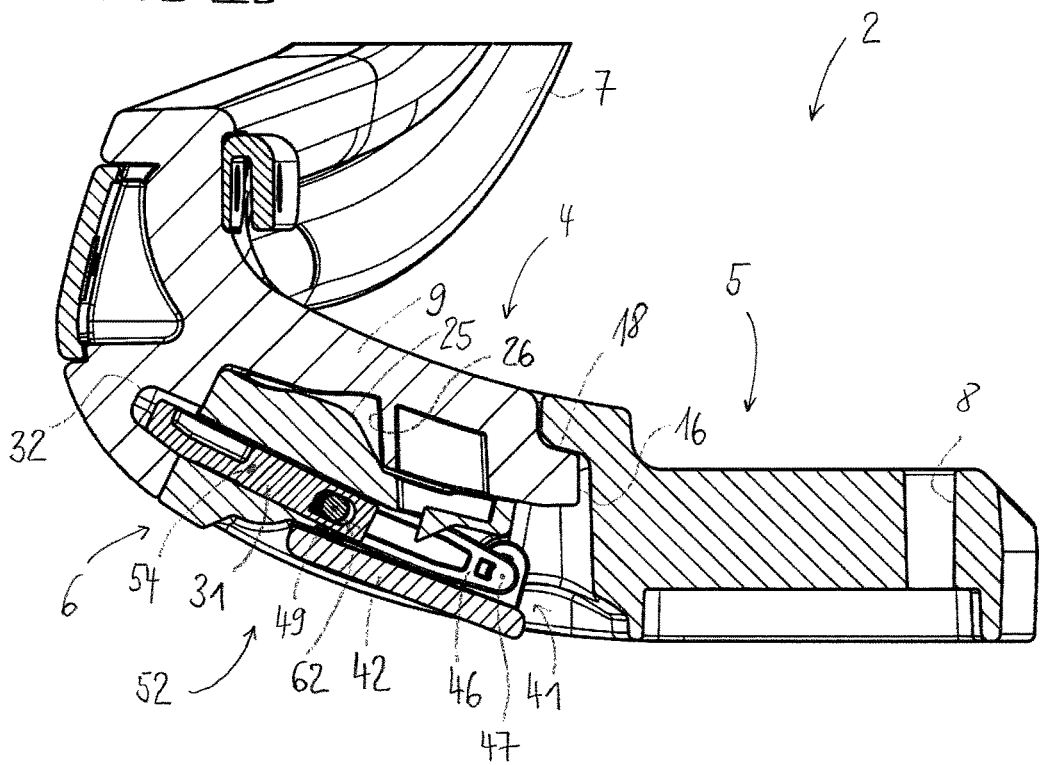

BACKREST SUPPORT FOR A SEATING FURNITURE

FIELD

The invention relates to a backrest support for a seating furniture, in particular for an office chair. Furthermore, the invention relates to a piece of seating furniture, in particular an office chair, having such a backrest support.

BACKGROUND

In order to save dispatch costs, pieces of seating furniture are often dispatched in a disassembled state. In the case of office chairs, the chair back is generally not fitted, but rather enclosed loosely with the other furniture parts. Even when frequently changing the location of the workstation, a chair may have to be repeatedly disassembled and assembled again.

The installation of a chair back on a chair has hitherto been comparatively complicated and generally requires a special tool. If the installation is intended to be carried out by an amateur, it is frequently not possible for said amateur to see whether the chair back has actually been correctly fitted. If a chair back has not been correctly fitted, there is the risk of the chair being damaged during use or of the user being injured.

SUMMARY

It is an object of the present invention to provide a piece of seating furniture having a backrest, in the case of which particularly simple and safe installation and removal of the backrest is possible.

This object is achieved by a backrest support as claimed in the claims and by a piece of seating furniture as claimed in the claims. Advantageous embodiments of the invention are specified in the dependent claims.

The advantages and configurations explained below in conjunction with the backrest support apply analogously also to the piece of seating furniture according to the invention, and vice versa.

A core concept of the invention is to design the backrest support in two parts, namely having a first support part, which is toolless connectable to a second support part, with a releasable connection being formed, wherein, in order to reach the final installation state, the position of the two support parts with respect to each other is toolless securable by means of a, preferably manually actuable, lock.

With the aid of the invention, a chair back can be fitted and removed by a technical amateur, for example an end customer, themselves and without a tool. With the aid of the invention, it is always ensured that the mechanical connection which is produced between the two support parts is secure.

Beyond the simple and safe installation without a tool, the invention permits repeated feedback to the fitter such that it is possible for the latter to see in a simple and error-proof manner whether the back has been fitted correctly and securely.

Despite the division of the backrest support into two parts, it is ensured with the aid of the invention that the back is mounted and remains without play in the final installation state. A play-free connection is permanently ensured even after repeated disassembling and fitting.

These two support parts are preferably assigned to different components of the seating furniture. In particular, the one support part is structurally assigned to the backrest and supports the backrest in the conventional sense, while the other support part is structurally assigned to the rest of the seating furniture, in particular to the base support, to the seat support or to another support element or frame element of the seating furniture. The individual support parts can be connectable to the components of the seating furniture assigned to them, again with a releasable connection being formed. As an alternative thereto, the support parts, however, can also be connected in one part or integrally to the components of the seating furniture assigned to them.

According to a preferred embodiment of the invention, it is provided that the first support part is designed as a backrest-side support part and is therefore connectable to a backrest of a seating furniture or is designed as an integral part of such a backrest, while the second support part is designed as a base-support-side support part and is therefore connectable to a base support of a seating furniture or is designed as an integral part of such a base support. However, the invention is not restricted to this division of the functions of the two-part backrest support. The first support part can also be designed as a base-support-side support part, while the second support part is designed as a backrest-side support part.

According to a preferred embodiment of the invention, the two support parts are designed in such a manner that the one support part can be placed into the other support part, wherein, even in this installation state which is not yet locked, connecting surfaces of the two support parts that are suitably designed, are abutting or lie against one another prevent a movement of the one support part relative to the other support part in at least one direction in space. It has proven to be particularly advantageous if the backrest-side support part which can frequently be handled more simply is mounted in the base-support-side support part, since the base support, frame or the like of the seating furniture is generally already connected to a substructure, for example to a cruciform chair base or the like, and stands on the floor at the installation time. The connecting surfaces of the two support parts are then preferably designed in such a manner that a pivoting of the fitted backrest-side support part together with the backrest in the pivoting direction is already possible. In other words, the backrest can already be brought from its unpivoted, typically more or less upright position into a rearwardly pivoted position without the connection between the two support parts being released. Following this first joining step, the connection can then be secured by the lock.

According to a preferred embodiment of the invention, the lock between the two support parts can be produced by a catch, which is guided on the one support part, engaging in a receptacle provided on the other support part. Catch and/or receptacle are designed here in such a manner that a push-in wedge connection is produced. In the case of the latter, workpieces provided with wedge surfaces are pushed rectilinearly in relation to one another in order to join or to release the connection. Owing to said push-in wedge connection, not only is a particularly simple and secure connection of the two support parts possible, but it is also possible for manufacturing tolerances, as occur during the production of the support parts, to be simply and effectively compensated for. It has proven to be particularly advantageous if the engagement of the catch in the receptacle is secured by means of a spring arrangement which has a number of (i.e. one or more) spring elements acting on the catch. In this way, a secure lock can be permanently ensured while maintaining the tolerance compensation.

According to a preferred embodiment of the invention, the catch engages in the receptacle by preferably rectilinear displacement of the catch, and the catch has at least one catch wedge surface which is inclined at an angle α toward the push-in path, as a result of which, in the final installation state, the position of the two support parts with respect to each other is secured. This wedge angle α is preferably shallow enough for the lock to be self-locking, in particular in such a manner that the catch is prevented from being pushed out of the receptacle during all functional movements of the seating furniture, in particular even during pivoting of the backrest.

According to a preferred embodiment of the invention, the receptacle has at least one corresponding receptacle wedge surface, i.e. which interacts with the catch wedge surface upon engagement of the catch in the receptacle and which likewise has the wedge angle α. The mutual position of the two workpieces is then secured in a force-fitting and form-fitting manner because of the wedge effect.

According to a preferred embodiment of the invention, the one support part has a toggle lever mechanism which is configured for the displacement of the catch. With the aid of this toggle lever mechanism, a particularly simple and secure actuation of the lock between the two support parts is possible. At the same time, the desired feedback properties in conjunction with the reaching of the final installation state can thus be implemented particularly simply.

According to a preferred embodiment of the invention, when the toggle lever mechanism is actuated during the locking of the connection, the toggle lever axis of rotation is moved beyond a dead center when a specified force is exceeded, and therefore a subsequent movement of the toggle lever mechanism is no longer possible without an external action. With the aid of such an over-center locking, a very secure connection can be produced in the case of which an unintentional release is eliminated.

With the invention, the structural and operational advantages of a toggle lever mechanism are combined with the advantages of a spring arrangement acting on the catch, and therefore not only is permanent tolerance compensation but also permanent securing of the push-in wedge connection made possible.

DESCRIPTION OF THE FIGURES

An exemplary embodiment of the invention is explained in more detail below with reference to the drawings, in which:

FIG. 7 shows a view of the backrest support during the first installation step (first longitudinal section), FIG. 8 shows a view of the backrest support after the first installation step (first longitudinal section), FIG. 9 shows a view of the backrest support after the first installation step (second longitudinal section), FIG. 10 shows a view of the backrest support after the second installation step (second longitudinal section)

DETAILED DESCRIPTION

All of the figures show the invention not true to scale, merely schematically and only with its essential components. The same reference signs correspond to elements of an identical or comparable function.

Figure 1:
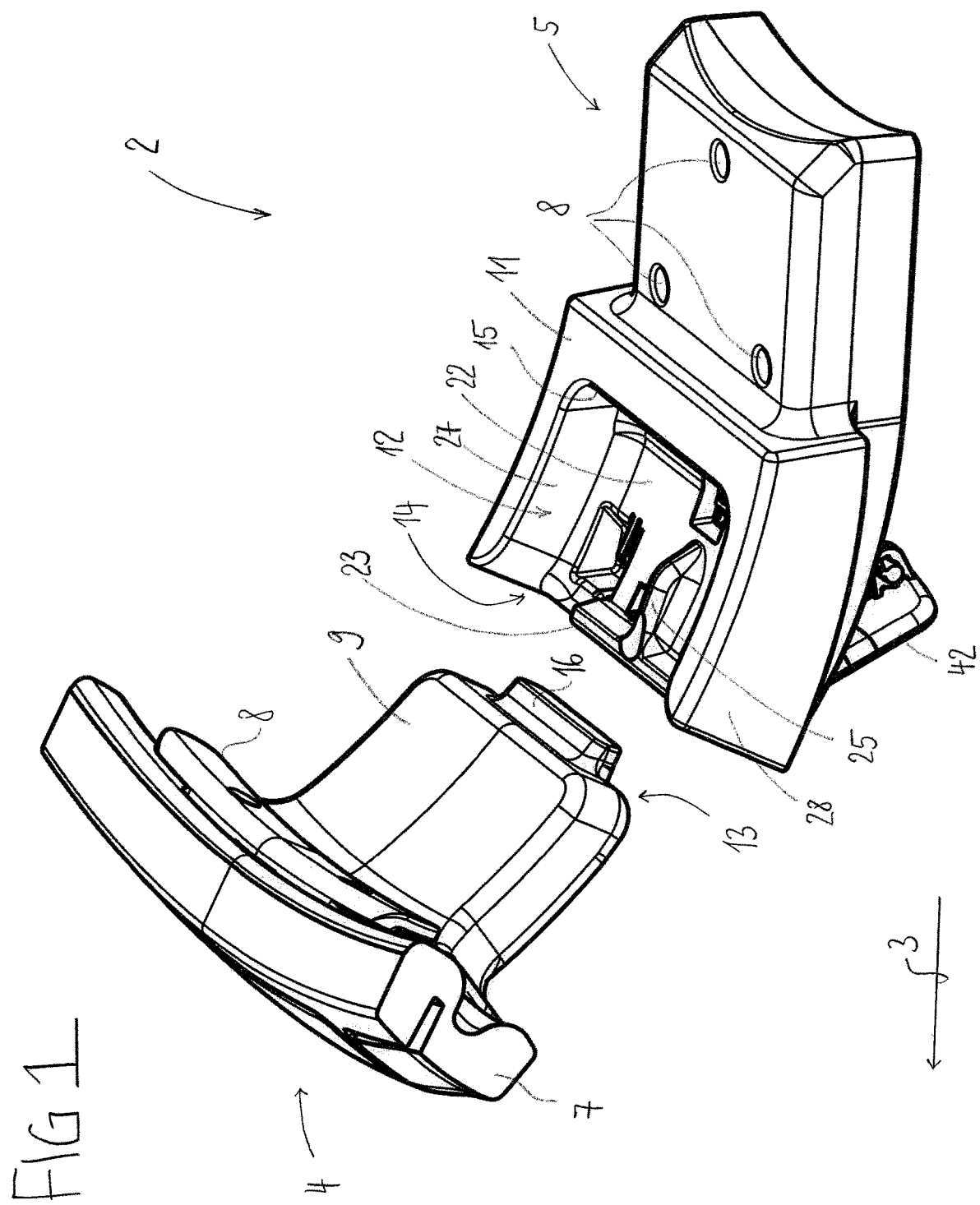
FIG. 1 shows a perspective view obliquely from above of the backrest support prior to the assembly.
Figure 2:
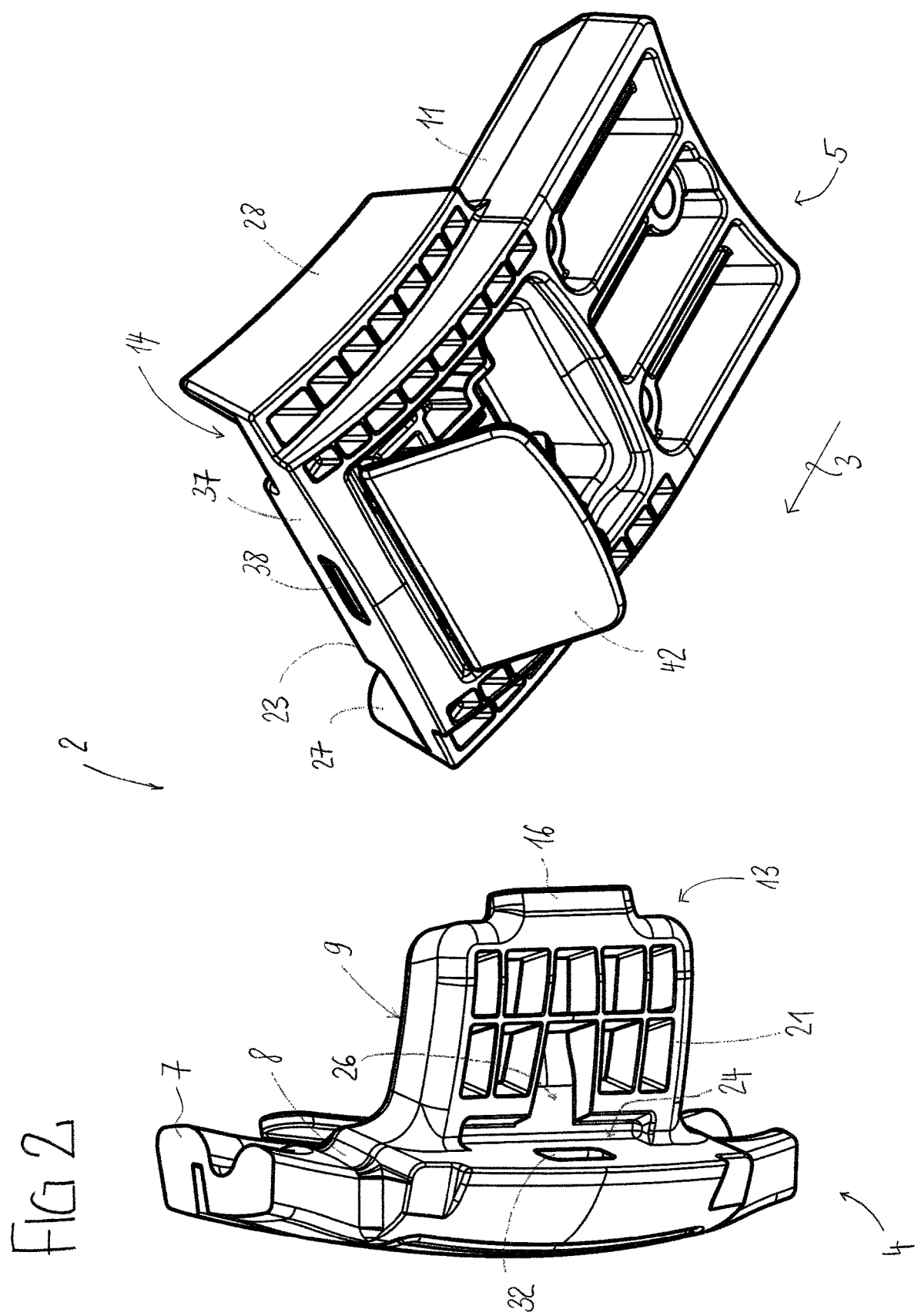
FIG. 2 shows a perspective view obliquely from below of the backrest support prior to the assembly.

The invention is explained using the example of a backrest support 2 for an office chair. The backrest support 2 is designed in two parts. The division is undertaken transversely with respect to the chair longitudinal direction 3. The backrest support 2 has a first support part 4 and a second support part 5, see FIGS. 1 and 2. These support parts 4, 5 are connectable to each other, with a releasable connection being formed. In order to reach the final installation state, the position of the two support parts 4, 5 with respect to each other can be secured by means of a preferably manually actuable lock 6.

Except for the spindle required for the articulated connections and the spring elements of the spring arrangement, all of the components of the backrest support 2 are manufactured from plastic.

The first support part 4 is designed as a backrest-side support part and is therefore structurally assigned to the backrest 7. It supports the backrest 7 (merely indicated in the figures). The first support part 4 and the backrest 7 are manufactured from one piece. The second support part 5 is designed as a base-support-side support part and is therefore structurally assigned to the base support (not depicted) of the office chair. In the example shown here, it is connectable to the base support with the aid of screws, for which purpose screw holes 8 are provided in the support part 5.

The installation is undertaken in two steps without a tool. In a first step, the first support part 4 is placed into the second support part 5, wherein, by means of this joining together or one in the other, the backrest support 2 is already assembled in such a manner that the support parts 4, 5 are held together. In order to reach the final installation position, in which the support parts 4, 5 are connected fixedly to each other without play, manual locking of the connection takes place in a subsequent second step.

With the aid of the releasable connection of the two support parts that is produced by placing the first support part 4 into the second support part 5, the movement of one support part 4 in relation to the other support part 5 in selected directions of space is already prevented. The connecting surfaces of the two support parts 4, 5 are designed here in such a manner that as early as after the first installation step, neither of the two support parts 4, 5 has to be held any longer by the fitter. A pivoting movement of the backrest support 2 rearward in the chair longitudinal direction 3 is likewise already possible.

In the illustrated example, a cheek 9 which extends away forward centrally from the base 8 of the first support part 4 in the chair longitudinal direction 3 is placed obliquely from above into an upwardly open, trough-shaped recess 12 provided on the basic body 11 of the second support part 5 such that the two support parts 4, 5 overlap. The installation is undertaken by a movement of the first support part 4, which is moved by the fitter, in the chair longitudinal direction 3 onto the fixed second support part 5. The installation direction (arrow 10) is therefore from the left to the right in FIG. 7. For simplified installation, the cheek 9 converges slightly conically in the direction of its front free end 13; the recess 12 accordingly likewise tapers slightly from its front-side opening 14 in the direction of its rear end side 15.

At its front, free end 13, the cheek 9 has a holding lug 16 extending transversely with respect to the chair longitudinal direction 3. During the installation, the holding lug 16 is inserted into a cutout 17, provided at the rear end side 15 of the recess 12, in such a manner that, in the joint state, it is placed under a holding edge 18 of the cutout 17, see FIG. 7. The first support part 4 is thereby mounted in the second support part 5.

In the state thus fitted, the upper sides and the lower sides of the two support parts 4, 5 form substantially continuous surfaces of the backrest support 2, which surfaces correspond to those surface profiles of a single-part backrest support, see FIGS. 8 to 10.

The lower side 21 of the cheek 9 and the base 22 of the recess 12 are provided with contours which substantially correspond to one another and which lie on one another in the fitted state. The contour of the base 22 comprises a holding collar 23 which runs transversely with respect to the chair longitudinal direction 3, is formed rectilinearly and is arranged centrally in the front-side opening 14 of the recess 12, opposite the rear end side 15 of the recess 12. In the fitted state, the holding collar 23 engages in a corresponding holding groove 24, which runs transversely with respect to the chair longitudinal direction 3 and is provided on the contour of the lower side 21 of the cheek 9, immediately before the cheek 9 adjoins the base 8. In this way, holding collar 23 and holding groove 24 form a pull-out safety device. A guide arm 25 is provided in a manner connected centrally to the holding collar 23, said guide arm 25 extending in the direction of the end side 15 of the recess 12 and, in the fitted state, lying in a mating guide receptacle 26 on the lower side 21 of the cheek 9. This guide arm/guide receptacle combination 25, 26 serves to facilitate the insertion of the first support part 4 into the second support part 5 by means of centering guidance.

In conjunction with the holding lug 16 which lies on the holding edge 18, engages under the holding edge 18 and forms a means of securing against lever movements of the first support part 4 directed counter to the installation direction 10, the first support part 4 is fixed to the second support part 5 at least with respect to one direction in space by the holding collar/holding groove combination 23, 24. Since the first support part 4 furthermore lies in the trough-shaped recess 12 which, by means of its lateral boundary walls 27, 28, also laterally delimits a movement of the first support part 4, as a result, after completion of the first installation step, the first support part 4 is already fixed in two directions in space.

If at least some of the interacting connecting surfaces of the two support parts 4, 5 are of wedge- or prism-shape design in a suitable manner, the mechanical play, caused by manufacturing tolerances, between the two support parts 4, 5 can thereby be compensated for. In particular, the play in the horizontal direction can be eliminated by a holding collar/holding groove combination 23, 24 configured in a wedge shape or prism shape. The corresponding cross-sectional contours become clear from FIGS. 7 and 8.

By means of the lock 6 produced in the second installation step, the connecting surfaces of the one support part are then permanently placed without play on the connecting surfaces of the other support part. The final installation state in which the first support part 4 is fixed to the second support part 5 in all directions in space is therefore achieved.

In the fitted state, the position of the two support parts 4, 5 with respect to each other is secured by a push-in wedge connection. So that the first support part 4 can no longer be lifted out of the second support part 5, it has to be blocked. For this purpose, a catch 31 formed on the second support part 5 engages in a receptacle 32 on the first support part 4. This receptacle 32 is provided centrally on the first support part 4 below the cheek 9. A spring arrangement 33 which acts on the catch 31 and urges the catch 31 in the direction of the receptacle 32 serves for securing this engagement.

Figure 11:
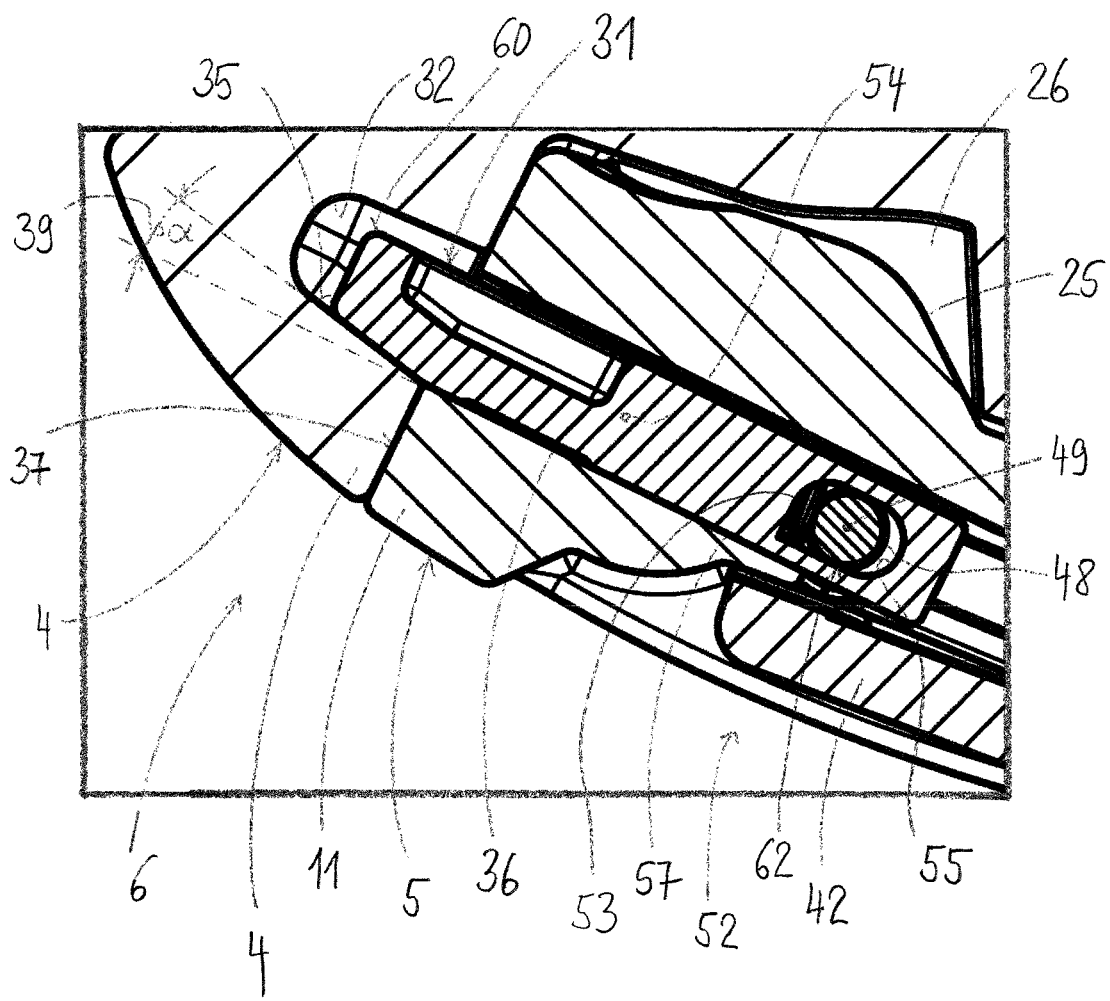
FIG. 11 shows a detailed view of the catch lying in the receptacle.

Due to the manufacturing tolerances during the production of plastics parts, the catch 31 has mechanical play in the receptacle 32. At the same time, the catch 31 requires a certain mechanical play so that it can be inserted at all into the receptacle 32. However, for a fixed and secure installation of the chair back on the chair, the play has to be completely eliminated in the final installation state of the backrest support 2. This is ensured by a wedge shape of the catch 31 in conjunction with a corresponding prism shape of the receptacle 32, on the one hand, and by the action of the spring arrangement 33 on the catch 31, on the other hand. For this purpose, catch 31 and receptacle 32 are designed in such a manner that they produce a push-in wedge connection during the engagement. The catch 31 has at least one catch wedge surface 34 which is inclined at an angle $\alpha$ (wedge angle 39) toward the push-in path, as a result of which, in the final installation state, the position of the two support parts 4, 5 with respect to each other is secured in a force-fitting and form-fitting manner. The receptacle 32 has a corresponding receptacle wedge surface 35, see FIGS. 9 and 11.

The catch 31 does not have to be enclosed on all sides in the receptacle 32. As illustrated in FIG. 10, it is sufficient if the corresponding wedge surfaces 34, 35 lie on each other. In this case, the catch 31 is not guided inside the receptacle 32. Instead, the catch 31 is guided in a push-in guide 36, which is attached centrally in the basic body 11 of the second support part 5, and is displaceable rectilinearly therein. During the production of the lock, the catch 31 moves out of the opening 38 in the push-in guide 36, said opening being provided centrally on the end side 37 of the basic body 11, and into the receptacle 32 as long as said catch lies with its oblique flank 34 fully on the corresponding wall surface 35 of the receptacle 32. In other words, the wedge surface 34 of the catch 31 that is inclined at the angle $\alpha$ toward the push-in path is displaced. The catch 31, which is designed as a push-in wedge, is guided here along the walls of the push-in guide 36, the walls serving as guide surfaces.

The catch 31 is permanently acted upon by the spring arrangement 33 with a force acting in the locking direction 30. The locking direction 30 is opposed to the installation direction 10. This force brings about a pressure on the catch 31, ensuring that the catch is pushed into the receptacle 32. The spring arrangement 33 therefore holds the catch 31 under load in the final installation state, i.e. throughout the duration of the locking.

In order, in the locked state, during all functional movements of the chair, in particular when pivoting back the backrest support 2 from a pivoted rear position forward in the chair longitudinal direction 3, despite the action upon the catch 31 by the spring arrangement 33, to prevent the catch 31 from being pushed out of the receptacle 32, the lock 6 is designed to be self-locking. This is ensured by a very shallow wedge angle 39 ($a$). To securely implement the self-locking properties, the wedge angle 39 may not exceed a defined maximum value.

The second support part 5 is provided with a toggle lever mechanism 41 which is configured for the displacement of the catch 31 and with the aid of which the catch 31 is moved out of the second support part 5 and, as a result, engages in the receptacle 32 on the first support part 4 in order to produce the push-in wedge connection.

Figure 3:
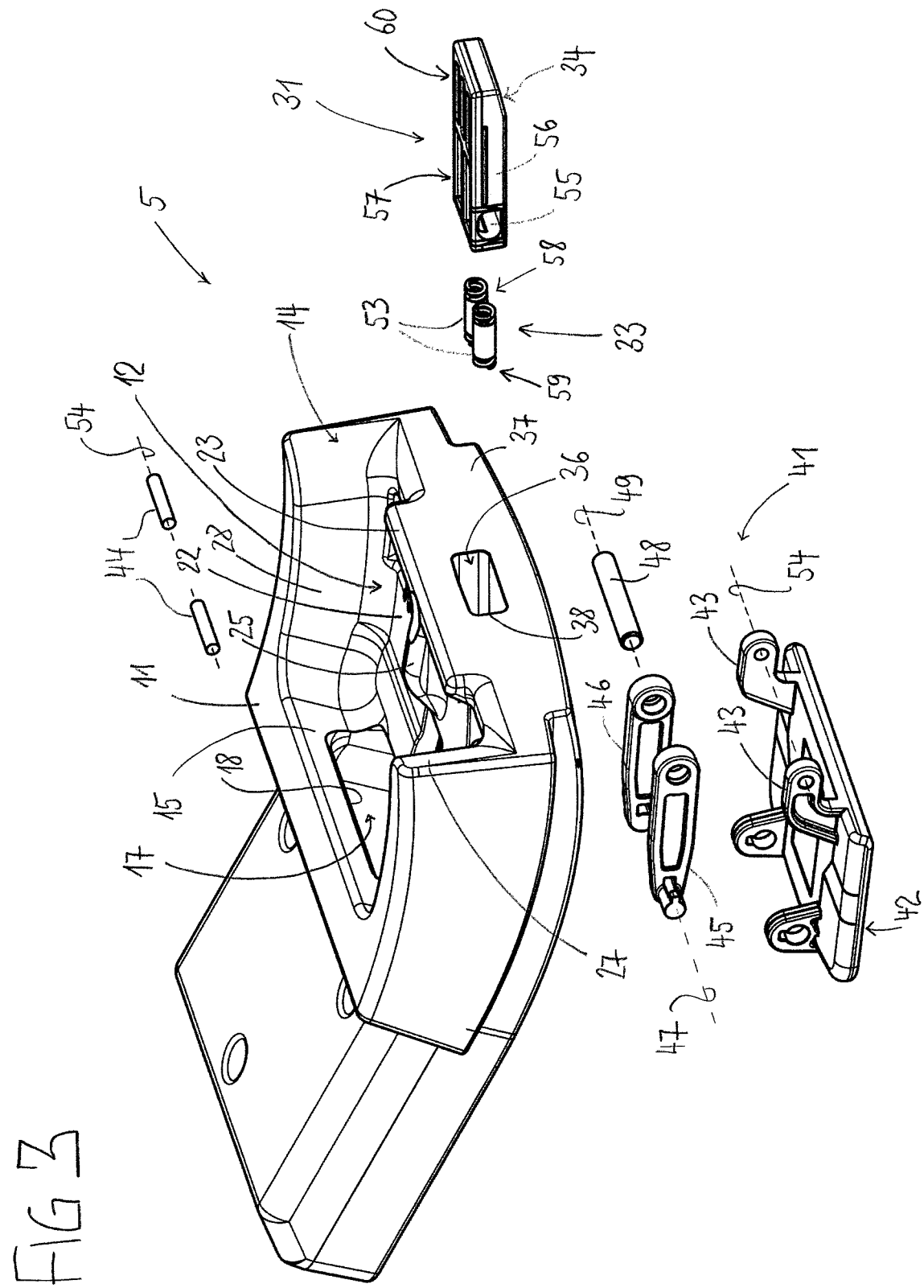
FIG. 3 shows an exploded illustration of the second support part.
Figure 4:
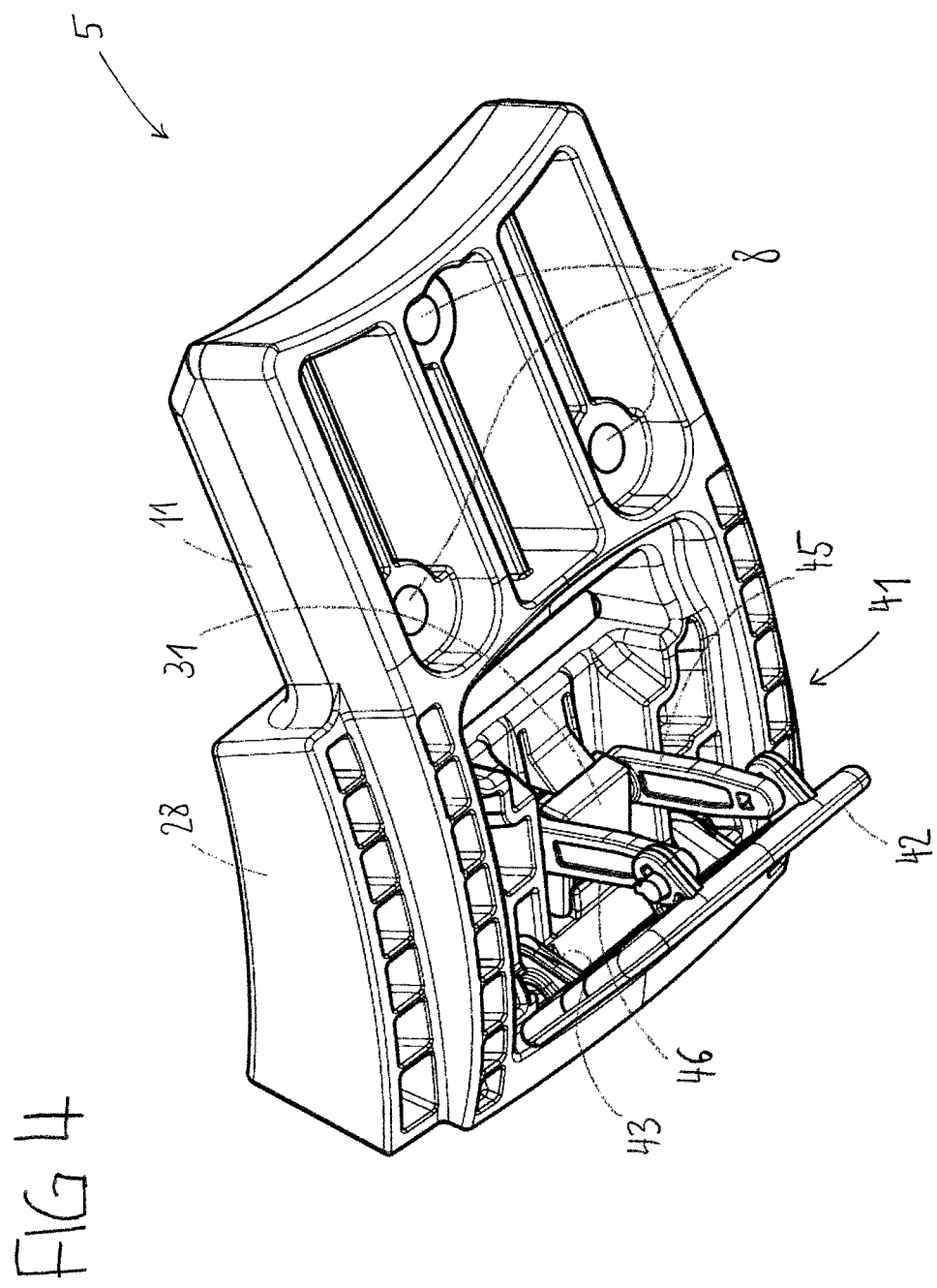
FIG. 4 shows a perspective view of the second support part with an open handle.

The toggle lever mechanism 41 has, as customary, three pivot points (axes of rotation) and two limbs forming the toggle lever linkage. The first limb of the toggle lever mechanism 41 is formed by a handle 42 which is articulated centrally on its one side on the basic body 11 of the second support part 5. For this purpose, links 43 attached to the handle 42 are mounted pivotably on spindles 44 which lie in a fixed position in the basic body 11. By means of this articulation of the handle 42 on the basic body 11, the first pivot point 54 of the toggle lever mechanism 41 is formed, see FIGS. 3, 10 and 11.

In the example illustrated here, the handle 42 is plate-like, but, while maintaining its function, may also be configured differently in order to be integrated into the design of the seating furniture.

On its opposite side, the handle 42 is articulated on a pair of limbs 45, 46 which forms the second limb of the toggle lever linkage 41. By this means, the second, central pivot point 47 of the toggle lever mechanism 41 is formed, see FIG. 9. By pivoting the handle 42 about the first pivot point 54, the second pivot point 47 is moved toward the basic body 11 of the second support part 5 or away therefrom.

While the two limbs 45, 46 of the pair of limbs are connected at their one end to the handle 42 in an articulated manner, they are connected at their other ends fixedly to a movable spindle 48 which extends transversely with respect to the locking direction 30 (displacement direction) of the catch 31. By this means, the third pivot point 49 of the toggle lever mechanism 41 is formed, see FIG. 11.

The toggle lever mechanism 41 is designed in such a manner that the handle 42 in the unlocked state, i.e. also after the first installation step, is in an open position 51 in which the handle 42 protrudes from the second support part 5, see FIGS. 1, 2, 4, 7, 8 and 9. Owing to said protruding position, the fitter obtains the visual signal that the installation is not yet finished.

Figure 5:
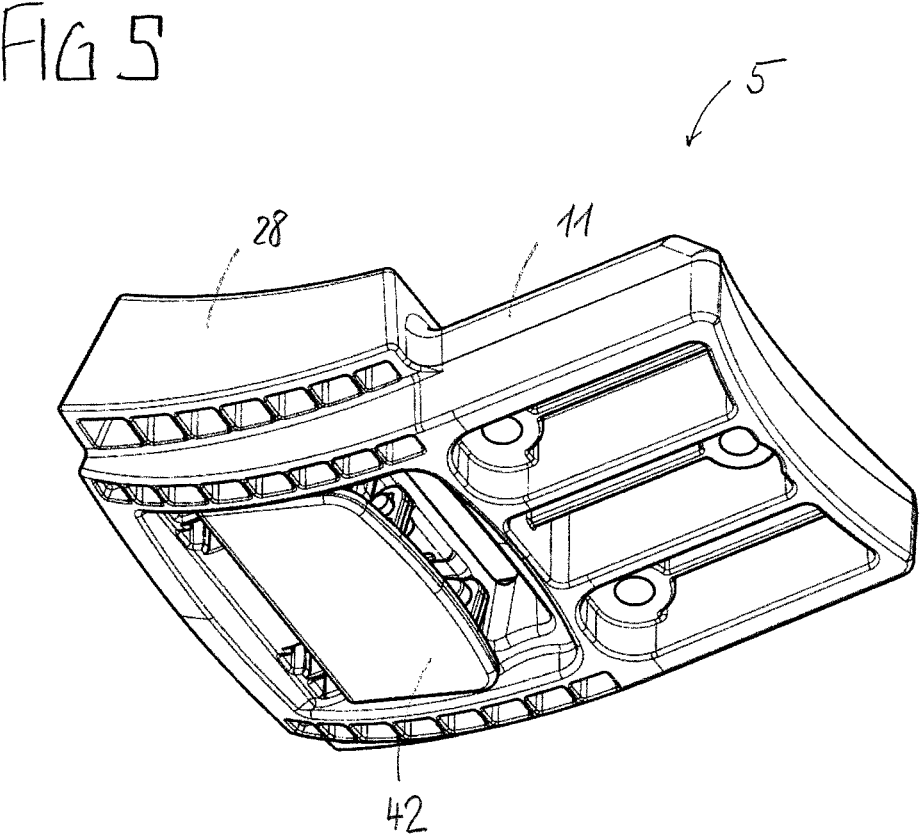
FIG. 5 shows a first perspective view of the second support part with a closed handle.
Figure 6:
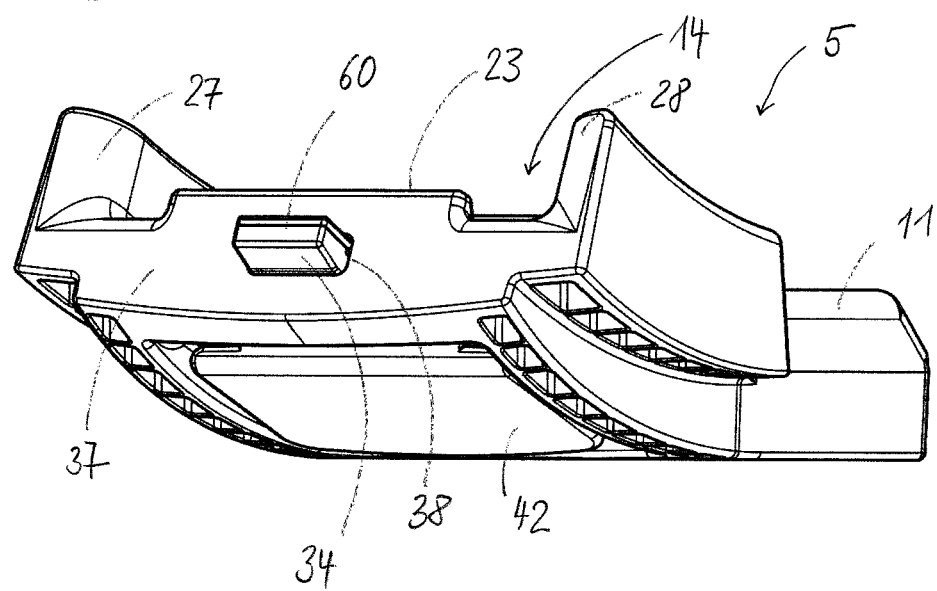
FIG. 6 shows a second perspective view of the second support part with a closed handle.

When the toggle lever mechanism 41 is actuated, it is moved beyond its dead center. In the process, a certain resistance has to be overcome during the movement of the handle 42. Subsequently, the toggle lever is over-extended and the toggle lever linkage moves automatically into its final position which constitutes a stable position of the toggle lever mechanism 41. The reaching of said over-center locking is therefore signaled haptically to the fitter, and at the same time an acoustic signaling takes place by the snapping into the over-extended position of the toggle lever linkage. In addition, in the final installation state, the handle 42 also no longer protrudes from the second support part 5, but rather lies in its closure position 52 on the basic body 11 of the second support part 5 such that the reaching of the final installation state can also be checked visually by the fitter, see FIGS. 5, 6 and 10.

The over-center locking of the toggle lever mechanism 41 is produced by the toggle lever axis of rotation 47 being moved beyond a dead center during the locking of the push-in wedge connection of the two support parts 4, 5. In the dead center, the pivot points 47, 49, 54 and the acting forces are located on a straight line. In the over-center position, the pivot point 47 lies above the line connecting the pivot points 49, 54, see FIG. 10.

The spring arrangement 33 comprises two spring elements 53 acting in parallel. These spring elements 53 are the spring elements acting upon the catch 31 when the push-in wedge connection exists. The spring elements 53 are firstly supported with their foot-side ends 58 on the catch 31, namely at the point where the hollow part of the catch 31 merges into the catch head 60 (not illustrated in the figures). Secondly, the spring elements 53 are supported with their head-side ends 59 on the movable spindle 48, the position of which defines the third pivot point 49 of the toggle lever mechanism 41.

In order, firstly, to provide the catch 31 with the play in the locking direction 30 that is required for forming the push-in wedge connection and in order, secondly, at the same time to ensure a permanent action on the catch 31 when the lock 6 exists, the movable spindle 48 lies in a pair of elongated holes 55 configured as a spindle guide. The pair of elongated holes 55 is formed in side walls 56 of the catch 31, said side walls laterally delimiting the hollow part 57 of the catch 31 that forms the foot-side end of the catch 31 and in which the spring elements 53 lie, while the solid, head-side end of the catch 31, the catch head 60, on which the foot-side ends 58 of the spring elements 53 are supported, serves for engaging in the receptacle 32.

During the locking operation, the two limbs of the toggle lever linkage that are formed by the handle 42, on the one hand, and the pair of limbs 45, 46, on the other hand, move relative to one another, wherein the circular movement path of the second pivot point 47 is specified by the connection of the handle 42 with the first pivot point 54 to the basic body 11. The linear movement path of the third pivot point 49 activated by the second limb 45, 46 is specified by guiding the catch 31 within the second support part 5.

During the unlocked position of the support parts 4, 5 and during the movement of the catch 31 into the receptacle 32, the movable spindle 48 lies in a rear position 61 in the pair of elongated holes 55, see FIG. 9. If the dead center is passed over and the over-center locking is achieved, the spring elements 53 engaging on the catch 31 act upon the catch 31, and the movable spindle 48, on which the spring elements 53 are supported, lies in a front position 62, which is shifted forward in relation to the rear position 61 in the direction of the catch head 60, inside the pair of elongated holes 55, see FIGS. 10 and 11.

The spring elements 53 ensure that the handle 42 remains in the closed state after passing over the dead center. The spring elements 53 provide the restoring force to the handle 42, and therefore hold the toggle lever mechanism 41 in its inoperative position beyond the dead center.

The spring elements 53 are designed in such a manner that they always act with the required minimum force on the catch 31, no matter how large the mechanical play, occurring due to production tolerances, of the catch 31 in the receptacle 32 is.

In the embodiment illustrated in the figures, the backrest 7, which can be handled better individually, is mounted into the chair base (not illustrated), wherein the handle 42 is provided on the base-support-side support part 5 as part of the toggle lever mechanism 41. However, the invention is not restricted to this division of the functions of the two-part backrest support 2. A precisely converse assignment is also possible. Instead of the first support part being mounted in the second support part, the second support part can also be mounted in the first support part and/or the toggle lever mechanism can be provided on the backrest-side support part.

All of the features illustrated in the description, the following claims and the drawing can be essential to the invention both individually and in any desired combination with one another.

These features and combinations of features may respectively substantiate an independent invention, the use of which is expressly reserved.

When a combination of features defining an invention is specified, it is not imperatively necessary to combine individual features from the description of an exemplary embodiment with one or more or all other features specified in the description of this exemplary embodiment; in this respect, any sub-combination of features of one or more exemplary embodiments is expressly also disclosed.

Moreover, substantive features of the apparatus may be used as method features when reworded, and method features may be used as substantive features of the apparatus when reworded. In this way, reworded features are implicitly also disclosed.

LIST OF REFERENCE SIGNS 1 (free)
2 Backrest support
3 Chair longitudinal direction
4 First support part
5 Second support part
6 Lock
7 Backrest
8 Base of the first support part
9 Cheek
10 Installation direction
11 Basic body of the second support part
12 Recess
13 Free end of the cheek
14 Opening of the recess
15 End side of the recess
16 Holding lug
17 Cutout
18 Holding edge
19 (free)
20 (free)
21 Lower side of the cheek
22 Base of the recess
23 Holding collar
24 Holding groove
25 Guide arm
26 Guide receptacle
27 Boundary wall
28 Boundary wall
29 (free)
30 Locking direction
31 Catch
32 Receptacle
33 Spring arrangement
34 Catch wedge surface
35 Receptacle wedge surface
36 Push-in guide
37 End side of the basic body
38 Opening in the push-in guide
39 Wedge angle
40 (free)
41 Toggle lever mechanism
42 Handle
43 Link
44 Positionally fixed spindle of the handle
45 Limb
46 Limb
47 Second pivot point, toggle lever axis of rotation
48 Movable spindle
49 Third pivot point
50 (free)
51 Open position
52 Closure position
53 Spring element
54 First pivot point
55 Pair of elongated holes
56 Side wall of the catch
57 Hollow part of the catch
58 Foot-side end
59 Head-side end
60 Catch head
61 Rear position of the toggle lever axis of rotation
62 Front position of the toggle lever axis of rotation

The invention claimed is:

1. A backrest support for a seating furniture, comprising:
a first support part, which is toolless connectable to a second support part, with a releasable connection being formed,
wherein, in an assembled state, the position of the two support parts with respect to each other is toolless securable by a lock to achieve a final assembly state,
wherein the lock has a catch, which is guided on the second support part, engaging in a receptacle provided on the first support part,
wherein the engagement of the catch in the receptacle is secured by a spring arrangement which acts on the catch and has one or more spring elements.

2. The backrest support as claimed in claim 1, wherein the catch engages in the receptacle by displacement of the catch, and the catch has at least one catch wedge surface which is inclined at an angle a toward the push-in path, as a result of which, in the final installation state, the position of the two support parts with respect to each other is secured.

3. The backrest support as claimed in claim 1, wherein the receptacle has at least one corresponding receptacle wedge surface.

4. The backrest support as claimed in claim 1, wherein the second support part has a toggle lever mechanism which is configured for the displacement of the catch.

5. The backrest support as claimed in claim 4, wherein, when a specified force is exceeded, the toggle lever axis of rotation is movable beyond a dead center and a movement of the toggle lever mechanism is no longer possible without an external action.

6. The backrest support as claimed in claim 4, wherein the toggle lever mechanism acts upon the one or more spring elements of the spring arrangement in order to secure the catch in the receptacle.

7. The backrest support as claimed in claim 1, wherein, in the assembled, unlocked state, the abutting connecting surfaces of the two support parts prevent a movement of the first support part relative to the second support part in at least one direction in space.

8. The backrest support as claimed in claim 1, wherein the seating furniture is an office chair.

9. A piece of seating furniture, having a backrest support as claimed in claim 1, the first support part of which is connectable to a backrest of the seating furniture or is designed as an integral part of such a backrest, and the second support part of which is connectable to a base support of the seating furniture or is designed as an integral part of such a base support.

10. The piece of seating furniture as claimed in claim 9, wherein the seating furniture is an office chair.

* * * * *